US005176499A

United States Patent [19]
Damlis et al.

[11] Patent Number: 5,176,499
[45] Date of Patent: Jan. 5, 1993

[54] PHOTOETCHED COOLING SLOTS FOR DIFFUSION BONDED AIRFOILS

[75] Inventors: Nicholas Damlis, Cincinnati; James A. Martus, West Chester; Edward H. Goldman, Cincinnati, all of Ohio

[73] Assignee: General Electric Company, Cincinnati, Ohio

[21] Appl. No.: 719,901

[22] Filed: Jun. 24, 1991

[51] Int. Cl.⁵ ............................................. F01D 3/02
[52] U.S. Cl. ............................ 416/97 R; 416/231 R; 416/95; 29/888.024
[58] Field of Search ...................... 416/95, 96 R, 96 A, 416/97 R, 97 A, 231; 29/888.024, 888.02

[56] References Cited

U.S. PATENT DOCUMENTS

| | | | |
|---|---|---|---|
| 3,372,031 | 5/1973 | Bowling et al. | 416/231 R |
| 3,584,972 | 6/1971 | Bratkovich et al. | 416/97 A |
| 3,619,082 | 11/1971 | McGinnis | 416/97 A |
| 3,656,222 | 4/1972 | Jones . | |
| 3,778,183 | 12/1973 | Luscher et al. | 416/97 A |
| 3,864,199 | 2/1975 | McGinnis | 416/97 A |
| 3,950,114 | 4/1976 | Helms | 416/97 A |
| 4,004,056 | 1/1977 | Carroll | 416/231 R |
| 4,042,162 | 8/1977 | McGinnis et al. | 416/96 R |
| 4,089,456 | 5/1978 | Toppen et al. . | |
| 4,128,928 | 12/1978 | Shotts et al. . | |
| 4,269,032 | 5/1981 | McGinnis et al. | 416/97 A |
| 4,302,940 | 12/1981 | Meginnis | 416/97 A |
| 4,437,810 | 3/1984 | Pearce . | |
| 4,526,512 | 7/1985 | Hook . | |
| 4,574,451 | 3/1986 | Smashey et al. | 416/97 R |

FOREIGN PATENT DOCUMENTS 716612 10/1954 United Kingdom .
1078116 8/1967 United Kingdom .

Primary Examiner—Thomas E. Denion
Attorney, Agent, or Firm—Jerome C. Squillaro

[57] ABSTRACT

Cooling passages are accurately formed along the faying surfaces of a pair of diffusion bonded members such as a pair of half sections used to fabricate an airfoil. A particularly advantageous application of the invention is the photoetching of cooling air grooves into the opposed surfaces of a diffusion bonding foil used to form a diffusion bond between the faying surfaces of a trailing edge portion of a turbine blade or turbine vane. Such grooves may be made extremely small and in high numbers to promote efficient cooling of the trailing edge portions of these airfoils.

14 Claims, 4 Drawing Sheets

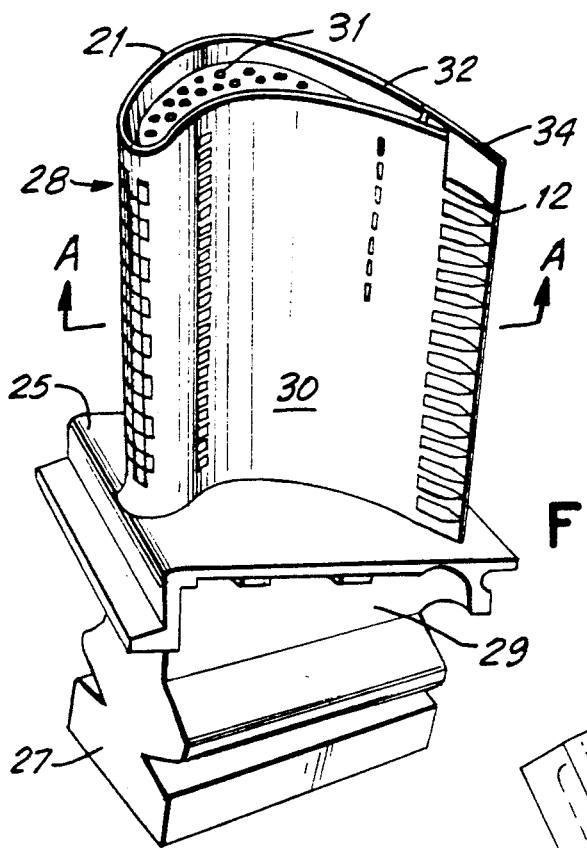
FIG.3
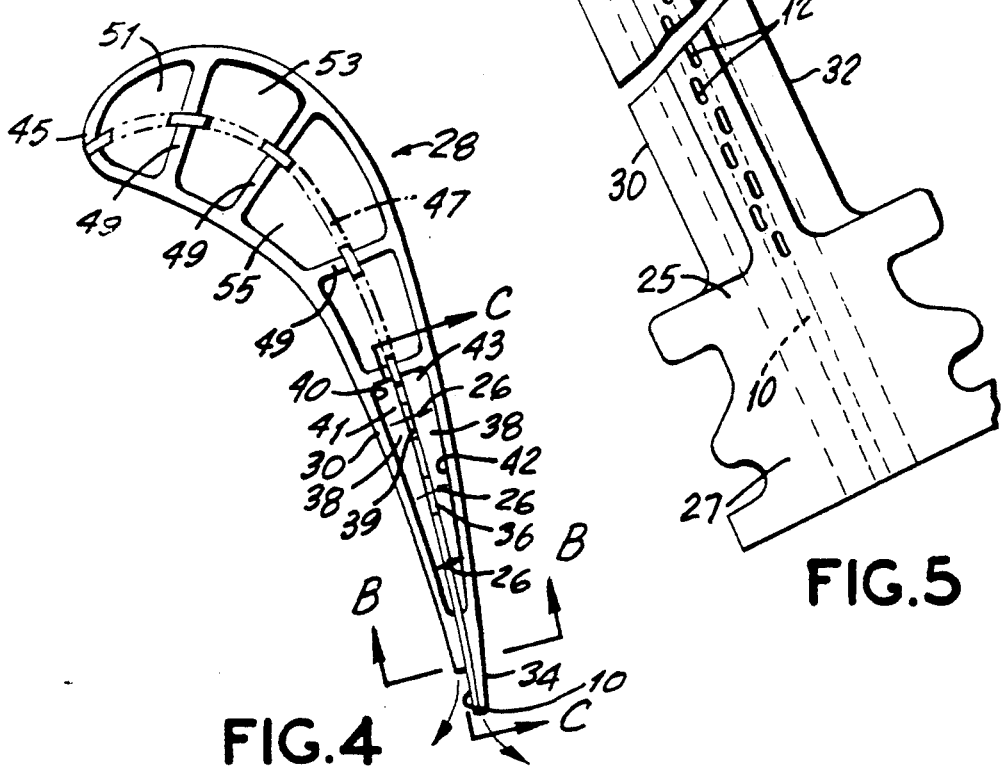
FIG.4
FIG.5

PHOTOETCHED COOLING SLOTS FOR DIFFUSION BONDED AIRFOILS

The government has rights in this invention pursuant to Contract No. F33615-87-C-2764 awarded by the Department of the Air Force.

CROSS REFERENCE TO RELATED APPLICATIONS

Reference is hereby made to the following co-pending U.S. patent application dealing with related subject matter and assigned to the Assignee of the patent invention: "Method for Joining Single Crystal Members and Improved Foil Therefor" by Ramgopal Darolia, et al., assigned U.S. Ser. No. 07/615,553 and filed Nov. 19, 1990.

BACKGROUND OF THE INVENTION

1. Field of the Invention

The present invention relates in general to the provision of photoetched grooves or slots between the faying surfaces of a diffusion bond and relates in particular to the formation of fluid flow channels in a diffusion bonding foil located between the faying surfaces of an airfoil blade or vane of a gas turbine engine.

2. Description of Prior Developments

Diffusion bonding, which includes diffusion brazing and diffusion welding, is a form of solid state welding which is accomplished by bringing the surfaces of two or more members to be joined together under moderate pressure and elevated temperature. Diffusion bonding usually is carried out in a controlled atmosphere wherein a coalescence of the interfaces or faying surfaces can occur. Melting or fusion of the members being bonded is not generally associated with this process.

Diffusion bonding typically requires weld durations ranging from minutes to hours. Coalescence of the faying surfaces is produced with minimum macroscopic deformation by diffusion-controlled processes that are induced by applying heat and pressure for a predetermined time interval. In most cases, the equipment used to form diffusion bonds or welds is custom built and welding is carried out in a vacuum, in an inert gas or, in a reducing atmosphere.

A diffusion bond or weld is formed when the faying surfaces of two or more materials are brought together sufficiently close so that short range interatomic forces operate. Initial contact is made between surface asperities when a load is applied. Further contact is made by plastic yielding and creep deformation. Diffusion bonding is usually carried out at a welding temperature equal to or greater than one-half of the melting temperature of the material being bonded, welded or brazed. The original faying surfaces eventually disappear thereby resulting in a completed weld.

Interlayers of other similar metals in the form of thin foils or coatings have been used between faying surfaces to overcome metallurgical bonding problems and/or to facilitate bonding. Interlayers can reduce bonding or welding temperatures, restrict high deformation to the interlayer zone, improve mating of rough surfaces, reduce bonding time, and reduce oxidation. Interlayers should be metallurgically compatible with the base metals and should not form a low toughness zone. In some cases, interlayers having melting points lower than the base metals being welded are used to obtain low welding temperatures.

One application of diffusion bonding is disclosed in U.S. Pat. No. 3,656,222 which is incorporated herein by reference. This patent discloses an airfoil blade blank which is formed by diffusion brazing two separate blade blank portions together using an interlayer sheet of brazing material. Cooling air passages or slots are formed in one or both of the blade blank portions as well as through complementary or matching portions of the interlayer sheet of brazing material. The slotted blade blank portions and interlayers, once diffusion brazed, are used to form a finished airfoil-shaped blade by any suitable method.

Although the finished blade of U.S. Pat. No. 3,656,222 may function suitably for its intended purpose, a continuing need exists for higher operating temperatures in gas turbine engines within which such blades operate. This need may, in part, be satisfied by improving the air cooling rate of these blades by optimizing and increasing the cooling air coverage or surface areas cooled. Such coverage is presently limited by the machining or forming techniques used to cut or form the cooling passages through which cooling air flows to extract the heat from the airfoils heated by hot flowing exhaust gasses.

That is, the more area covered by the cooling slots or passages, the greater the potential for improved cooling performance. Currently used machining techniques are limited as to the size, spacing and location of the cooling slots or passages which may be produced in airfoil blades as well as in any other heated members which may be cooled by internally channeled cooling fluids. Moreover, such conventional machining techniques used to form such cooling slots are quite expensive, time consuming and labor intensive.

Accordingly, a need exists for a method of forming extremely small, narrow, accurately placed cooling grooves or slots within a heated element capable of being cooled by internally flowing cooling fluid. This need is particularly acute in the case of airfoil blades and vanes, particularly along their hot trailing edge portions which tend to experience the highest operating temperatures. Such a method should be relatively easy to perform and result in cost savings over conventional methods.

SUMMARY OF THE INVENTION

The present invention has been developed to fulfill the needs noted above and therefore has as an object the provision of extremely small, accurately positioned and accurately dimensioned fluid flow grooves or slots in an internally cooled machine part via photoetching.

Another object of the invention is the provision of photoetched cooling fluid slots in an internally cooled machine part which is fabricated using diffusion bonding.

Yet another object of the invention is the provision of photoetched cooling fluid slots between the faying surfaces of a diffusion bonded airfoil.

Still another object of the invention is the provision of cooling fluid slots adjacent the faying surfaces of a diffusion bonded airfoil by photoetching grooves in a diffusion bonding foil and/or by photoetching grooves in the faying surfaces adjacent the foil prior to diffusion bonding.

Another object of the invention is to increase the number of cooling fluid slots per unit area in the trailing edge of a heated airfoil using the combined techniques of photoetching and diffusion bonding.

Briefly, the invention is directed to photoetching one or both sides of a diffusion bonding foil so as to form one or more cooling channels, cooling grooves or cooling slots in the foil surfaces. This technique makes optional the prior requirement of machining cooling fluid flow grooves in the faying surfaces of the machine parts which are subsequently bonded together.

Preferably, the cooling fluid flow grooves do not extend completely through the foil but only part way through so as to define recesses, channels or grooves in one or both surfaces of the foil. This allows grooves to be formed on both sides of the foil thereby increasing the number of grooves available per unit area along or adjacent to the diffusion bond.

Because photoetching is used to form the fluid flow grooves, much smaller slots and grooves can be formed than possible with prior electrical machining techniques such as ECM and EDM. For example, the smallest fluid flow hole diameter achievable with conventional ECM or EDM apparatus is about 0.012 inch. This size is determined by the size of the tool used to apply acid or electrical current to the part.

However, photoetched holes or grooves produced according to the present invention are not limited by line of sight machining requirements nor by the size of any tool and may easily be produced with diameters, widths or depths of only 0.005 inch or less. This allows for a greater concentration of fluid flow holes, grooves or slots per unit area. This increases the total surface area of a diffusion bonded part exposed to the heat transfer fluid flowing therethrough and thereby increases the rate of heat transfer from or to the part. This is of particular value in the case of cooling air applied to the trailing edge of a heated airfoil. Any desired pattern of photoetched cooling fluid flow slots or grooves may be formed in the diffusion bonding foil and/or in the faying surfaces of the bonded parts in a manner analogous to that used in the manufacture of semiconductor chips. For example, a mask having a desired pattern of the cooling slots may be placed over the foil or the part. The foil or part may then be dipped in an acid which etches only the exposed portions of the foil or part. The depth of the slot may be controlled by the time of exposure to the acid. No electrical current is required.

Alternatively, the foil and/or part may be coated with a light sensitive masking material. Those portions of the foil or part to be etched may be exposed to light thereby causing the masking material to fall away in a known manner. The resulting foil and mask combination may then be immersed into an acid bath for a predetermined time interval during which the acid will remove (etch) material from the unmasked portions of the foil or part at a known time rate. The resulting etched foil or part is then removed from the acid bath and exposed to a neutralizer to stop the etching process. At this point, the mask is removed from the foil or part in a known fashion leaving an etched foil or part suitable for diffusion bonding according to the invention.

The cooling fluid flow slots or grooves may be photoetched to virtually any size or shape and contoured for optimum cooling effectiveness. Photoetching overcomes many of the problems and limitations associated with conventional machining techniques such as line of sight requirements, minimum hole size to hole width relationships and hole to target relationships.

Photoetching, as compared to other machining techniques, is generally less expensive and can increase the density or number of fluid flow slots per unit area in the trailing edge of an airfoil blade by a factor of two over conventional machining techniques. This increase in the area cooled can increase the overall efficiency of the gas turbine engine within which the airfoil blade operates.

In a variation of the invention, it is possible to photoetch cooling fluid slots or grooves in the faying surface of one or more parts to be joined by a diffusion bond. In this case, should a diffusion foil be used, no etching of the foil would be required, although in some applications it may be desirable to do so.

In another variation of the invention, a conventional one-piece cast airfoil may be formed with a slot along its trailing edge and a photo-etched diffusion bonding foil may be wedged or fitted within the slot and then diffusion bonded in place. This approach allows the invention to be practiced with conventional one-piece cast airfoils which previously were limited to having relatively large cooling holes formed through their solid trailing edges during the casting process or by subsequent machining using EDM, ECM or laser. In this variation, the diffusion bonding foil does not serve so much as a bonding element for bonding two separate members together as it does for providing high density accurately formed cooling channels in the slotted trailing edge of a one-piece cast airfoil. This allows for the formation of smaller cooling holes and can result in improved cooling.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings

FIG. 3 is a perspective view of a gas turbine engine airfoil such as a turbine vane or turbine blade fabricated in accordance with the present invention;

FIG. 4 is a sectional view taken through line A—A of FIG. 3;

FIG. 5 is a fragmental view taken through line B—B of FIG. 4;

In the various figures of the drawing, like reference characters designate like parts.

DETAILED DESCRIPTION OF THE PREFERRED EMBODIMENTS

Figure 1:
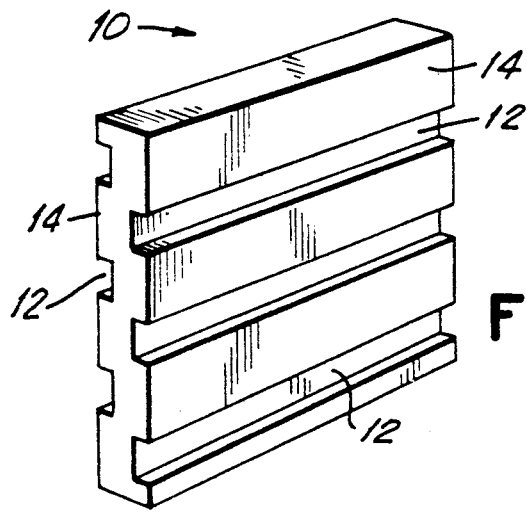
FIG. 1 is a perspective view of a diffusion bonding foil having photoetched cooling slots formed therein.

The present invention will now be described in conjunction with the drawing, beginning with FIG. 1 which schematically shows a diffusion bonding foil 10 having a plurality of cooling slots or cooling grooves 12 formed in each of its opposed side surfaces 14. Foil 10 may be formed of any suitable sheet stock as long as the stock material is compatible with the base materials to which it is to be diffusion bonded. Generally, the material of foil 10 is chosen to be similar to the base alloys to which the foil is to be diffusion bonded.

In the case of foil 10 of FIG. 1, grooves 12 may be photoetched to a depth of about 0.005 inch below each side surface 14. Although both side surfaces 14 are provided with photoetched grooves as seen in FIG. 1, it is to be understood that only one side surface 14 may be etched in some applications. The thickness of foil 10 may be slightly greater than that commonly chosen for conventional diffusion bonding foils. For example, conventional foils may have a thickness of about 0.003 inch while foil 10 may have a thickness of about 0.015 inch.

Prior to photoetching, the side surfaces 14 of foil 10 may be coated with boron which serves as a melting point depressant and hastens the formation of diffusion bonding. The boron typically melts, vaporizes and flashes off at a predetermined temperature and in doing so lowers the melting point of the material of the contiguous faying surfaces. This promotes the migration of atoms between and across the faying surfaces so as to promote and hasten the formation of a diffusion bond. During photoetching of cooling grooves 12, the boron coating is removed from corresponding portions of side surfaces 14. It is noted that it may be necessary to apply stopoff to the slots to prevent the braze from sticking.

Figure 2:
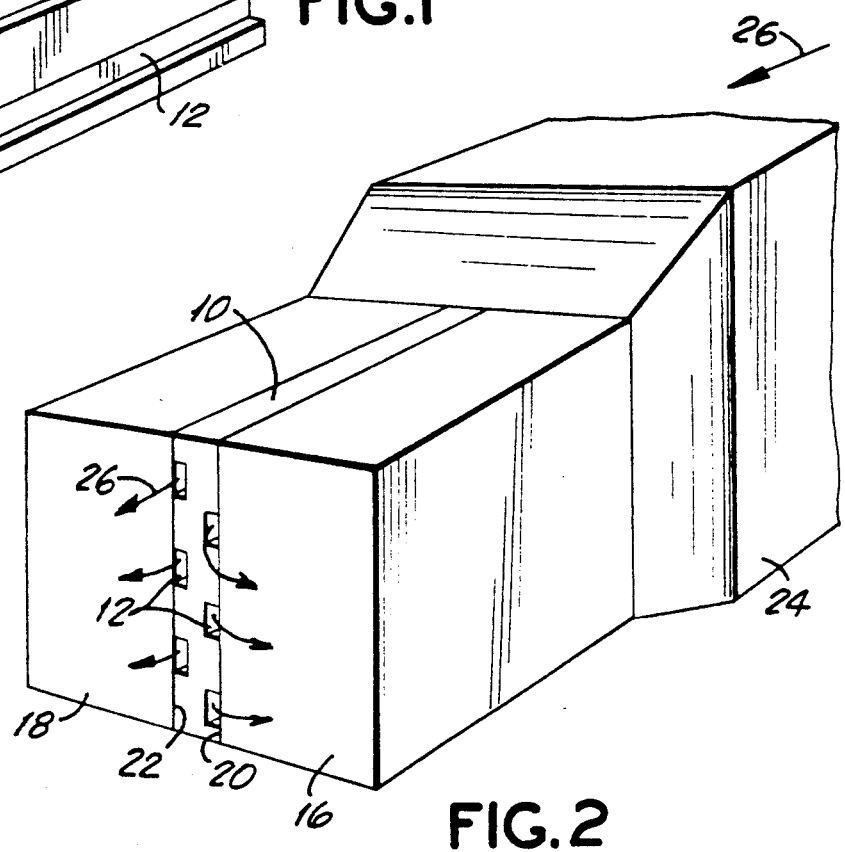
FIG. 2 is a schematic perspective view of a pair of machine elements diffusion bonded to one another with the bonding foil of FIG. 1 and connected to a source of cooling fluid.

As seen in FIG. 2, a pair of diffusion bondable members 16,18 is diffusion bonded together using the bonding foil 10 of FIG. 1. The photoetched bonding foil 10 is sandwiched between the members 16,18 and bonded in place via the application of heat and pressure. In the case of members 16, 18 taking the form of turbine blade or turbine vane half-section castings, a bonding temperature of about 2400° F. may be applied by placing the members 16, 18 in a furnace. A small load may be applied across the faying surfaces in a conventional fashion with the aid of a weighted fixture.

As a diffusion bond is formed, atoms from members 16, 18 migrate across the bonding foil 10. Bonding does not occur over the grooves 12 due to the prior removal of material from these grooves by photoetching which also removes any melting point depressant such as boron. During bonding, a slight degree of closure or collapse takes place between the faying surfaces 20, 22, for example, about 0.001 inch. However, this amount of closure is insufficient to close the grooves 12. Preferably, such closure is accounted for when selecting the depth of photoetching of grooves 12.

Although straight grooves 12 are shown in FIGS. 1 and 2, any desired shape of cooling circuit or passage may be formed such as serpentine, zig-zag or serrated, or arcuate cooling passages. Once bonded, members 16 and 18 may be connected to a suitable source of heat transfer fluid such as through flow conduit 24. Heat transfer fluid 26 may be directed from conduit 24 through grooves 12 to heat or cool members 16 and 18.

Members 16 and 18 will typically be exposed to a high temperature environment and thus be cooled via cooling fluid flowing through grooves 12. However, should members 16 and 18 require heating, heated fluid may be channeled through grooves 12 to heat these members.

A specific example of one application of the invention is seen in FIGS. 3, 4 and 5 wherein an airfoil 28, i.e., a turbine blade or turbine vane, is formed of two half-section castings or components 30,32 which may, for the purpose of explanation, be considered analogous to members 16,18 discussed above. As seen in FIG. 3, airfoil 28 includes a platform 25, dovetail portion 27 and a shank 29. The airfoil and platform may be mounted to a turbine rotor disc via dovetail portion 27 of shank 29. A perforated tip cap 31 is shown fitted within the tip 21 of airfoil 28 in a known fashion.

Each half-section casting 30,32 may be made from a conventional single crystal or directionally solidified high temperature nickel superalloy. The half-section castings may be cast in a configuration near to their final shape or may be cast as simple block castings. The half-section castings may then be machined according to conventional machining techniques to form the internal features of the blade or vane as well as to form the bonding surfaces or faying surfaces which will be later exposed to diffusion bonding.

Figure 6:
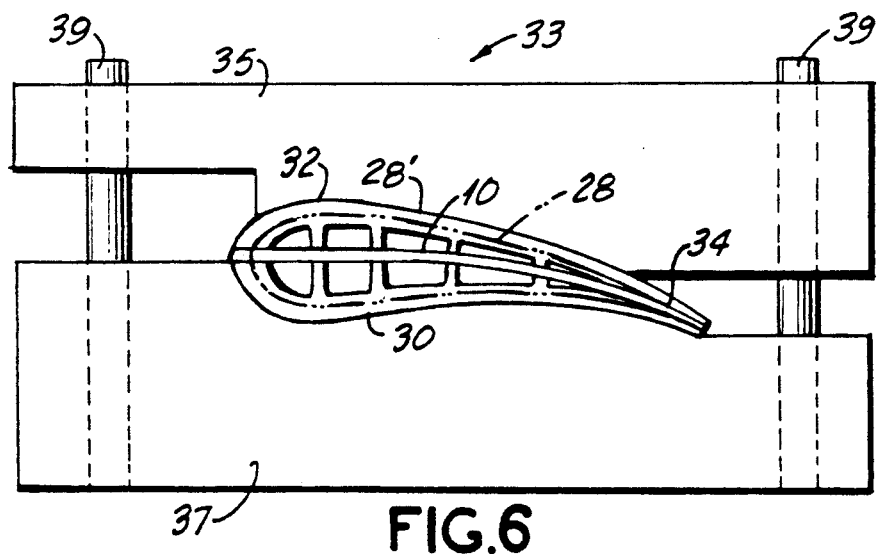
FIG. 6 is a schematic view of a mold used to form, for example, the diffusion bonded airfoil of FIGS. 3-5.

A pair of matched half-section castings 30,32 forming two turbine blade or vane halves may then be fitted together with a photoetched diffusion bonding foil 10 interposed between their faying surfaces and then bonded together in a mold 33 such as schematically depicted in FIG. 6. Mold 33 includes a top portion 35 aligned with a base portion 37 via alignment pins 39. Upon completion of the diffusion bonding cycle, the bonded turbine blade or vane 28 may have its exterior surface features finished using known machining methods resulting in a finished airfoil 28 as shown in phantom in FIG. 6.

Figures 7, 8:
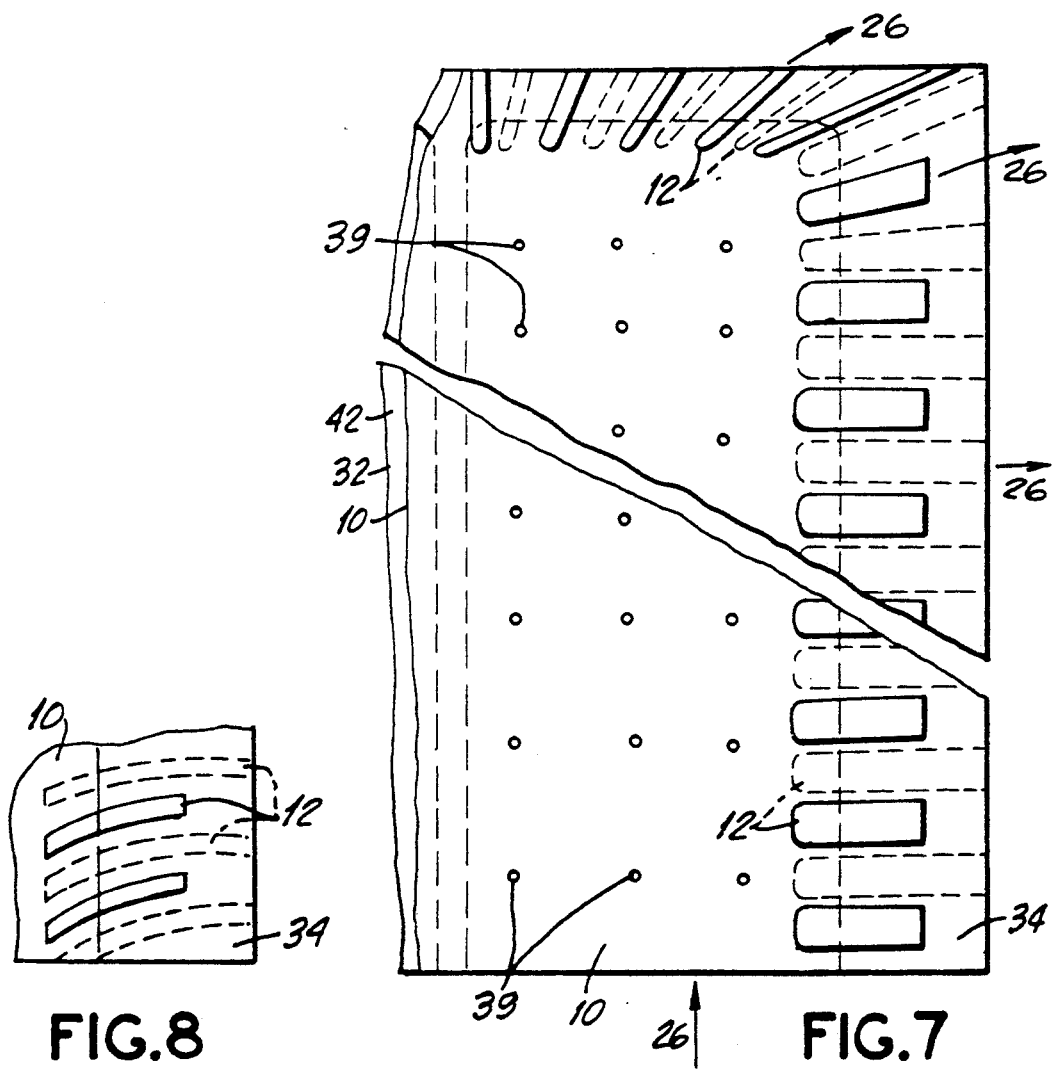
FIG. 7 is a fragmental view of the trailing edge portion of the airfoil of FIG. 4 taken along line C—C thereof.
FIG. 8 is a fragmental view of a lower corner portion of the airfoil of FIG. 4 showing an alternate cooling passage configuration.

As is well known, the thin sectioned trailing edge 34 of airfoil 28 experiences extremely high operating temperatures and requires as much cooling as is practical. As best seen in FIGS. 5, 7 and 8, the cooling of trailing edge 34 is improved by providing bonding foil 10 with photoetched grooves 12. As shown in FIG. 5, grooves 12 need not extend below platform 25 even though foil 10 extends completely through the shank 29 and dovetail portion 27 so as to provide a solid diffusion bond through these areas.

Unlike prior diffusion bonded airfoils, the half sections 30,32 of airfoil 28 need not be machined to form cooling slots or cooling fluid grooves 12. Rather, as noted above in connection with FIGS. 1 and 2, cooling fluid flow grooves 12 are preformed by photoetching bonding foil 10 prior to bonding of the half-section castings 30,32.

Bonding foil 10 may be formed of a nickel alloy having similar chemistry to that of the half-section castings, but with minor changes to facilitate grain growth across the faying surfaces during the diffusion bonding cycle.

In one example, the half-section castings may be formed of a nickel superalloy having a melting point of about 2430° F. The half-section castings may be arranged in a tool or a mold as shown in FIG. 6 and then placed in a vacuum furnace and maintained at a bonding temperature of about 2300°–2400° F. for approximately twenty hours under a bonding pressure or load of about 20–40 psi.

Figure 9:
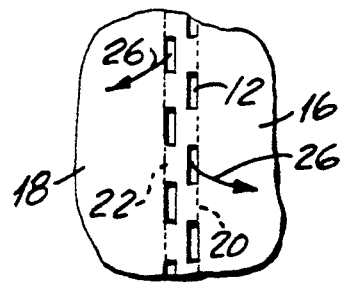
FIG. 9 is a fragmental view of the diffusion bond of FIG. 2.
Figure 10:
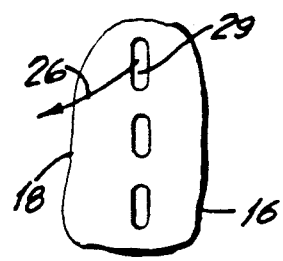
FIG. 10 is a fragmental view, taken on the same scale as FIG. 9, showing cooling grooves formed by prior art techniques such as casting, ECM, EDM or laser.

Because photoetching is capable of accurately forming much smaller sectioned grooves than possible with currently used techniques, the number of grooves per unit area along the faying surfaces of a diffusion bond formed according to the present invention may be effectively doubled. As seen in FIG. 9, cooling fluid flow grooves 12 may be alternately staggered, without overlapping, along faying surfaces 20, 22 to achieve a high degree of surface area contact with cooling fluid 26. However, as seen in FIG. 10, conventional machining techniques for the same wall thickness can only form a single row of larger holes 29 that are limited to line of sight machining in the same space.

By forming the cooling fluid flow grooves 12 in bonding foil 10 prior to bonding of the half-section castings 30, 32, any errors associated with the formation of cooling fluid flow grooves 12 are generally limited to the relatively inexpensive bonding foil 10. In contrast, prior airfoil fabrication techniques which required the machining of cooling fluid flow grooves 12 into the airfoil 28 could result in machining errors necessitating the complete reworking or scrapping of the entire airfoil. The same considerations apply to fabrication techniques where cooling fluid flow grooves are formed in the half sections prior to bonding.

As further seen in FIG. 4, a portion 36 of bonding foil 10 may be extended into the interior of cooling cavity 38 which is formed between the half-section castings 30, 32. In this case, portion 36 of bonding foil 10 will function as a high surface area heat sink or heat pipe which draws the heat away from the trailing edge 34 and into cavity 38 where the heat may be removed efficiently by the cooling air which flows therethrough. Although bonding foil 10 extends from leading edge 45 to trailing edge 34 along center line 47, portions of the bonding foil are typically removed prior to bonding from those areas it is not required such as from the forward cavities 51, 53, 55 etc., by trimming between rib members 49.

As seen in FIGS. 4 and 7, bonding foil 10 may be preformed with perforations 39. In this manner, cooling air from the interior of cavity 38 may be directed against either of the inner walls 40, 42 of half-section castings 30, 32 in the form of cooling air jets to cool the walls by impingement or by convection. Such cooling would typically be carried out on either of the inner walls, preferably the hotter one, by directing cooling air 26 radially outwardly or upwardly within the space defined between one of the inner walls and bonding foil 10. As seen in FIG. 4, cooling air 26 enters subcavity 41, passes through perforations 39, enters subcavity 43, impinges against inner wall 42 and then flows out trailing edge 34 via cooling fluid flow grooves 12.

As seen in FIG. 7, the orientation and size of cooling fluid flow grooves 12 may be varied to satisfy the cooling and strength requirements of the airfoil 28. FIG. 8 shows an alternate arcuate configuration for cooling fluid flow grooves 12.

Figure 11:
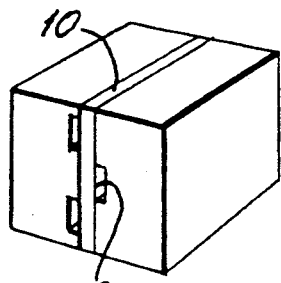
FIG. 11 is a schematic perspective view of an alternate embodiment of the present invention.

It is, of course, possible to photoetch the faying surfaces of members 16, 18 as seen in FIG. 11 as well as the analogous half-section castings 30, 32 of FIG. 4 to form fluid flow grooves 12. In this case, a solid bonding foil 10 may be used having a more conventional thickness such as 0.003 inch. However, if a mistake is made in photoetching members 16, 18 or half-section castings 30, 32, a relatively expensive part may be lost as compared to an inexpensive bonding foil. Moreover, it is usually easier to photoetch one part, i.e., the bonding foil 10, rather than two separate parts such as members 16, 18 or half-section castings 30,32.

Although the invention has been up to this point described in conjunction with machine elements and airfoils fabricated from at least two separate members or half-section castings, the invention may also be effectively applied to one-piece machine elements and airfoils which have been provided with slots for accepting a photoetched foil. For example, many conventional airfoils are investment cast as one-piece members with cast cooling slots or are subsequently machined by EDM, ECM or laser to provide cooling fluid slots through their trailing edge portions. The size of these slots is limited to a relatively large size, as discussed previously. However, by casting and/or machining a slot into the airfoil for receiving a photoetched foil, extremely narrow, high density cooling fluid flow paths may be formed as desired.

Figure 12:
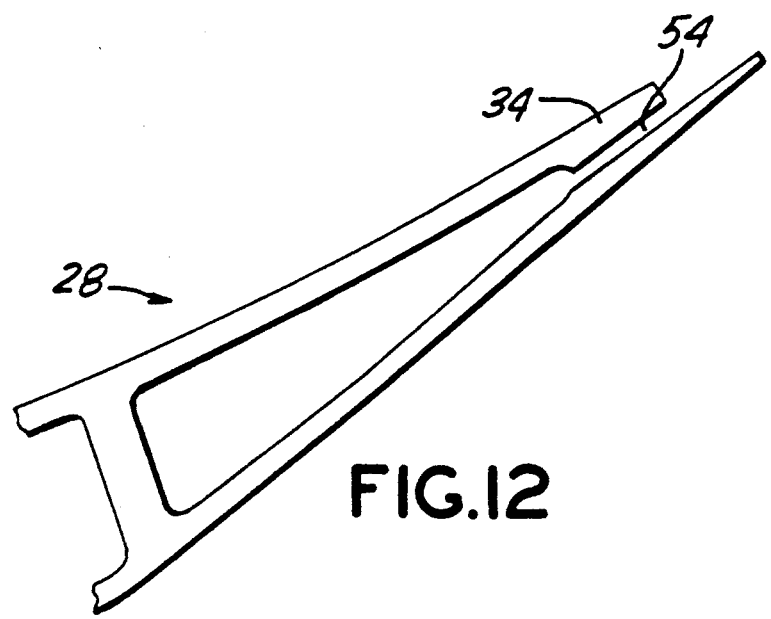
FIG. 12 is a fragmental schematic top plan view of a one-piece cast airfoil produced by conventional techniques and formed with a slotted trailing edge.

More particularly, as seen in FIG. 12, the trailing edge 34 of a one-piece cast airfoil 28 is provided with a slot 54 which may be formed during casting or subsequently machined therein. The final configuration of this design may be substantially the same as that shown in FIG. 3. Referring to FIG. 3, slot 54 may extend continuously from root or platform portion 25 through tip 21.

Figure 13:
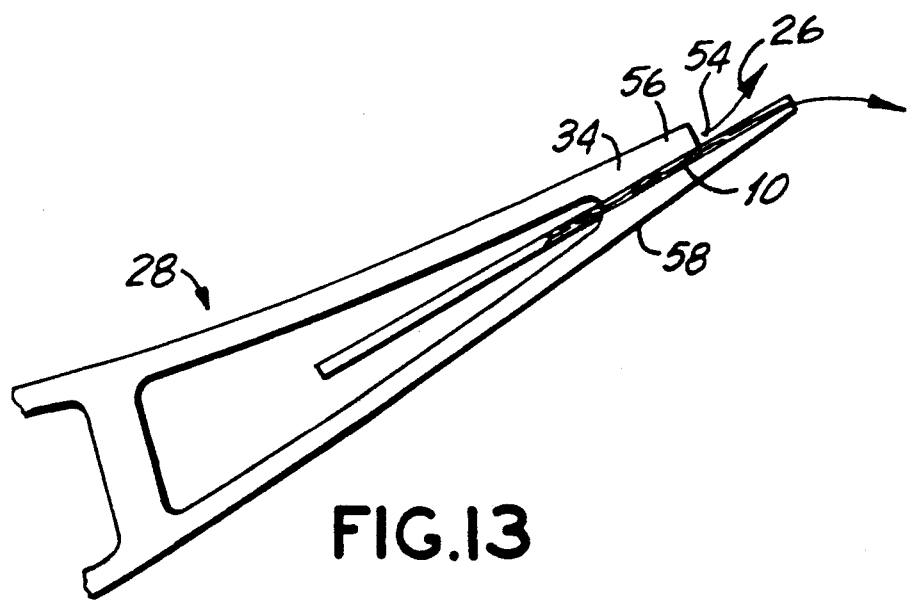
FIG. 13 is a view of FIG. 12 fitted with a photoetched foil which has been diffusion bonded within the slotted trailing edge of the airfoil.

A diffusion bonding foil 10 having photoetched cooling slots formed as noted above is inserted within slot 54 as seen in FIG. 13. The assembly of the one-piece cast airfoil 28 and bonding foil 10 may then be located in a weighted fixture or dead weight mold and placed in a vacuum furnace so as to form a diffusion bond between the bonding foil and trailing edge of airfoil 28.

The pressures and temperatures required during this bonding process forces one or both sides 56, 58 of trailing edge 34 to close down on bonding foil 10. This clamping or squeezing movement accommodates and negates any irregularities or tolerances associated with the formation of slot 54 and/or bonding foil 10. This movement can be controlled by appropriate design of the fixtures and tooling used during bonding so that only one side 56 or 58 may be allowed to move in a controlled predetermined manner.

This design can be used to improve existing one-piece blade and vane designs by allowing their cooling slots to be resized, reshaped and recontoured for optimum cooling effectiveness independently of present casting or machining capabilities. Existing casting tooling can easily be modified to produce the continuous slot 54. Such modification will also improve the casting yield by increasing the strength of the core in this area. Casting tolerances will also be improved in this area due to the simplified core print out.

As an alternative, the slot 54 and bonding foil 10, instead of being of constant width and thickness, may be tapered to reduce the amount of travel required of the airfoil sides. The bonding foil would in this case be wedged in place prior to bonding.

There has been disclosed heretofore the best embodiment of the invention presently contemplated. However, it is to be understood that various changes and modifications may be made thereto without departing from the spirit of the invention. For example, the present invention may be applied to efficiently cool (or heat) any application where a photoetched foil may be sandwiched between two or more contacting surfaces such as flanges, and turbine blade and turbine disk attachment faces. In this case, the bonding foil 10 would serve as a cooling or heating manifold which could be bonded or simply clamped between two members.

What is claimed is:

1. An airfoil, comprising:
   a first casting comprising a first dovetail portion, a first shank portion, a first tip portion and a first bonding surface extending from said first dovetail portion to said first tip portion;
   a second casting comprising a second dovetail portion, a second shank portion, a second tip portion and a second bonding surface extending from second dovetail portion to said second tip portion; and
   a foil forming a diffusion bond between said first and second bonding surfaces, said bond having a photoetched groove formed adjacent thereto for allowing cooling fluid to pass between and cool said first and second castings.

2. The airfoil of claim 1, wherein said airfoil further comprises a trailing edge portion and wherein said bond is formed within said trailing edge portion.

3. The airfoil of claim 1, wherein said groove is photoetched in a surface portion of said foil.

4. The airfoil of claim 1, wherein said airfoil includes an internal cavity and wherein said foil extends into said cavity.

5. The airfoil of claim 4, wherein said cavity is bounded by internal walls and wherein said foil is disposed adjacent said internal walls.

6. The airfoil of claim 1, wherein said first casting and said second casting each comprises an internal wall and wherein said foil is disposed adjacent each said internal wall for directing cooling air thereto.

7. The airfoil of claim 1, further comprising a plurality of photoetched grooves formed on opposite side portions of said foil for the passage of cooling air between said first and second castings.

8. The airfoil of claim 7, wherein said foil comprises a first plurality of spaced-apart grooves formed on one side portion of said foil and a second plurality of spaced-apart grooves formed on an opposite side portion of said foil and wherein said first and second plurality of grooves are arranged in a staggered, non-overlapping relationship.

9. A method for providing a fluid coolant groove in a cast airfoil having a first casting section bonded to a second casting section via a diffusion bonding foil extending from a root portion of said airfoil to a tip portion of said airfoil, wherein said method comprises:
   photoetching a groove within a surface portion of said diffusion bonding foil;
   sandwiching said diffusion bonding foil between said first and second casting sections; and
   forming a diffusion bond extending between said first and second casting sections from said root portion to said tip portion by the application of heat and pressure across said diffusion bonding foil such that said groove extends between said first and second sections after forming of said diffusion bond.

10. The method of claim 9, which further comprises applying a melting point depressant to said diffusion bonding foil prior to forming said diffusion bond.

11. The method of claim 9, wherein said diffusion bonding foil has a predetermined thickness and wherein said groove is provided by photoetching a surface portion of said diffusion bonding foil to a depth less than the predetermined thickness of said diffusion bonding foil.

12. An airfoil comprising a one-piece cast body having a diffusion bonding slot formed therein defining a pair of opposed diffusion bonding surfaces, and a photoetched diffusion bonding foil diffusion bonded within said slot and interconnecting said diffusion bonding surfaces and defining a fluid flow channel adjacent said slot, said flow channel comprising one portion defined by a photoetched portion of said foil and another portion defined by one of said pair of diffusion bonding surfaces.

13. The airfoil of claim 12 wherein said airfoil comprises a trailing edge portion and wherein said slot is formed in said trailing edge portion.

14. The airfoil of claim 13, further comprising a platform portion and a tip portion and wherein said slot extends between said platform portion and said tip portion.

* * * * *